(12) United States Patent
Reeves

(10) Patent No.: US 12,464,378 B2
(45) Date of Patent: Nov. 4, 2025

(54) CENTER OF GRAVITY FOR NETWORK ACCESS AND COMMUNICATION SERVICE

(71) Applicant: T-MOBILE INNOVATIONS LLC, Overland Park, KS (US)

(72) Inventor: Raymond Emilio Reeves, Oviedo, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 428 days.

(21) Appl. No.: 17/988,501

(22) Filed: Nov. 16, 2022

(65) Prior Publication Data

US 2024/0163690 A1 May 16, 2024

(51) Int. Cl.
*H04W 24/02* (2009.01)

(52) U.S. Cl.
CPC .................................. *H04W 24/02* (2013.01)

(58) Field of Classification Search
CPC ... H04W 64/006; H04W 64/00; H04W 12/63; H04W 16/28; H04W 84/005; H04W 4/08; H04W 24/02
See application file for complete search history.

(56) References Cited

U.S. PATENT DOCUMENTS

| 2019/0273542 A1* | 9/2019 | Dong | H01Q 25/02 |
| 2024/0038076 A1* | 2/2024 | Omi | G08G 5/34 |
| 2024/0171239 A1* | 5/2024 | Wang | H04B 7/0617 |

FOREIGN PATENT DOCUMENTS

| CN | 102202330 A | * | 9/2011 | |
| CN | 111049555 A | * | 4/2020 | H04B 13/02 |
| EP | 3813422 A1 | * | 4/2021 | H04W 4/40 |
| WO | WO-2014190528 A1 | * | 12/2014 | H04W 16/18 |

* cited by examiner

*Primary Examiner* — Dung Hong
(74) *Attorney, Agent, or Firm* — Shook, Hardy & Bacon L.L.P.

(57) ABSTRACT

Systems, methods, and computer-readable media are provided for dynamically adjusting a center of gravity for network access and communication service. Information comprising trace events and geo-location measurements of one or more UEs is initially received. Next, a network configuration corresponding to a node and profile information corresponding to the one or more UEs is retrieved. The profile information is utilized to determine a CoGNAC value for each of the one or more UEs. Based on the information and the CoGNAC value for each of the one or more UEs, a center of gravity is forecast for at least a portion of the node. Based on the forecasted center of gravity, operations support systems at a core network are engaged to provide instructions to the node to automatically make an angular adjustment for a lobe provided by at least the portion of the node.

20 Claims, 6 Drawing Sheets

CENTER OF GRAVITY FOR NETWORK ACCESS AND COMMUNICATION SERVICE

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that dynamically adjust a center of gravity for network access and communication service. To do so, information comprising trace events and geo-location measurements of one or more UEs is initially received. Next, a network configuration corresponding to a node and profile information corresponding to the one or more UEs is retrieved. The profile information is then utilized to determine a center of gravity network access and communication (CoGNAC) value for each of the one or more UEs. Based on the information and the CoGNAC value for each of the one or more UEs, a center of gravity is forecast for at least a portion of the node. Operations support systems at a core network can then be engaged to provide instructions to the node to automatically make an angular adjustment for a lobe provided by at least the portion of the node.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
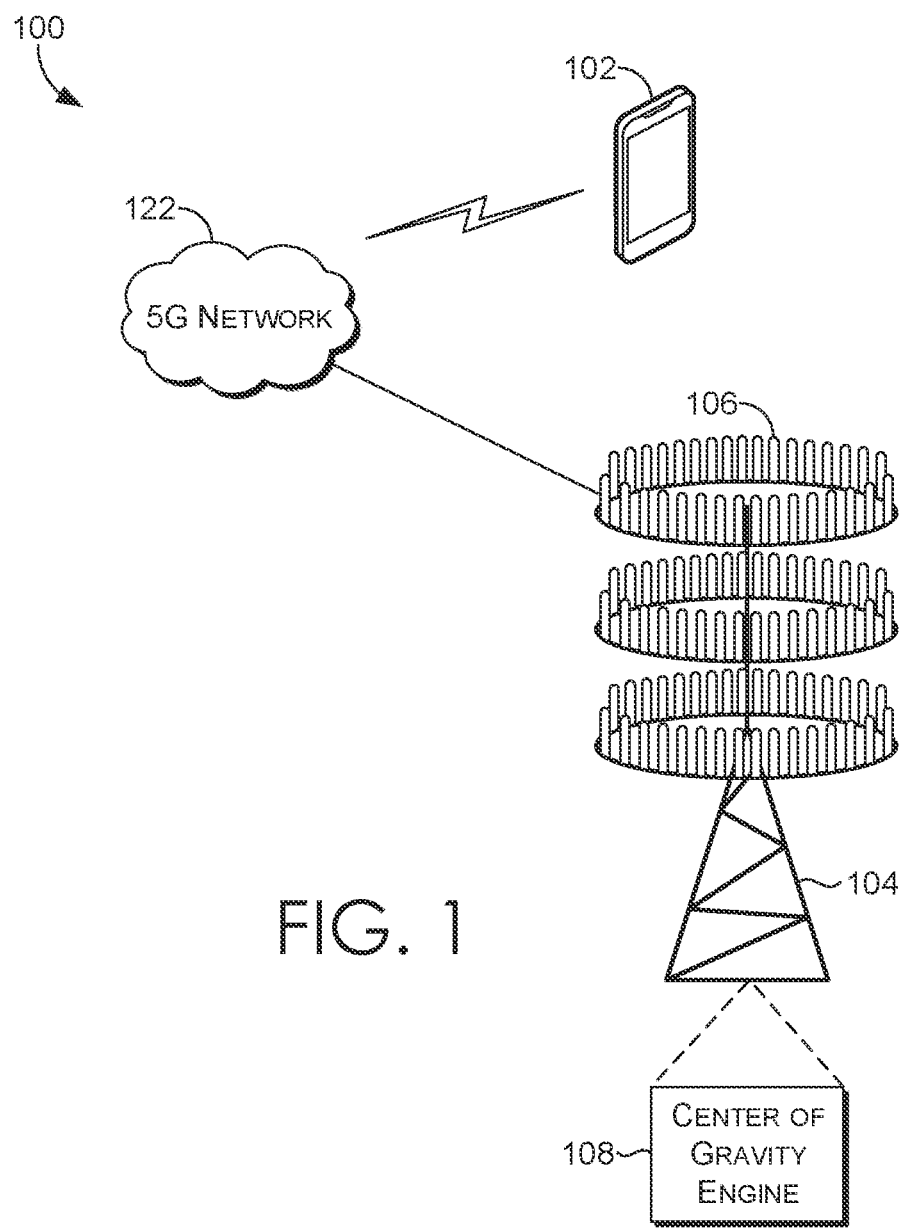
FIG. 1 depicts a schematic for an exemplary device, in accordance with an embodiment of the present invention.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AWS | Advanced Wireless Services |
| BRS | Broadband Radio Service |
| BTS | Base Transceiver Station |
| CDMA | Code Division Multiple Access |
| EBS | Educational Broadband Services |
| eNodeB | Evolved Node B |
| EVDO | Evolution-Data Optimized |
| gNodeB | Next Generation Node B |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| PCS | Broadband Personal Communications Service |
| RNC | Radio Network Controller |
| SyncE | Synchronous Ethernet |
| TDM | Time-Division Multiplexing |
| VOIP | Voice Over Internet Protocol |
| WAN | Wide Area Network |
| WCS | Wireless Communications Service |
| WiMAX | Worldwide Interoperability for Microwave Access |

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, antenna array configuration corresponding to both the access point and the UE, among other factors. The base stations are employed to broadcast and transmit transmissions to user devices of the telecommunications network.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

Historically, cellular network access services have been supported through simple antennas that in recent years have evolved into artifacts with multiple input multiple output (MIMO) radiation elements that direct their signals in a static direction either individually or acting as a whole. Similarly, all users and UE are considered equally deserving of communications services within the network coverage made possible by the network signal radiated by antennas and their individual elements. This equality may be reflected in how a UE travels through a coverage area. The signal is equally available to all other UEs that receive services in the coverage area, though the actual signal quality may vary depending on the angle and distance of the UEs from the antennas. Moreover, the actual signal quality may change depending on the UEs moving trajectory. Since a communication network's signal strength/quality is better the shorter the path to the antenna and closer to its center line of the propagation lobe, which as of today is engineered and static unless a network re-planning effort is triggered, it is evident that users with UEs mostly static in reference to the propagation lobe are expected to have the most consistent experience while limiting the value that operators may yield from its network assets when population mobility greatly deviates from the propagation lobe.

At a high level, systems, methods, and computer-readable media of the present invention enables the center line of a propagation lobe to by dynamically adjusted based on a center of gravity of the UE population in the coverage area. To determine a center of gravity of the UE population, a center of gravity network access and communication value is leveraged for each UE in the coverage area. In this way, the network service experience can be optimized to account for technical and business differences in the UE population. For example, if an emergency vehicle or a high business value UE enters the coverage area, the center line of the propagation lobe can be dynamically adjusted to ensure the emergency vehicle or the high business value UE is provided an optimized signal. In another example, if an older model UE enters the coverage area, the center line of the propagation lobe can be dynamically adjusted to ensure the older model UE is provided an optimized signal (i.e., in some aspects, this may mean the center line is adjusted towards the older model UE and away from newer model UEs).

In a first aspect of the present invention, computer-readable media is provided, the computer-readable media having computer-executable instructions embodied thereon that, when executed, perform a method for dynamically adjusting a center of gravity for network access and communication service (CoGNAC). The method includes receiving, at a CoGNAC agent, information comprising trace events and geo-location measurements of one or more user equipment (UEs). The information may be communicated by a node configured to wirelessly communicate with the one or more UEs. The method also includes retrieving, at a CoGNAC analyzer, a network configuration corresponding to the node and profile information corresponding to the one or more UEs. The method further includes determining, by the CoGNAC analyzer, utilizing the profile information corresponding to the one or more UEs, a CoGNAC value for each of the one or more UEs. The method also includes, based on the information and the CoGNAC value for each of the one or more UEs, forecasting, by the CoGNAC analyzer, a center of gravity for at least a portion of the node. The method further includes, based on the forecasted center of gravity, engaging, by the CoGNAC analyzer, operations support systems at a core network to provide instructions to the node to automatically make an angular adjustment for a lobe provided by at least the portion of the node.

In a second aspect of the present invention, a method for dynamically adjusting a center of gravity for network access and communication service (CoGNAC) is provided. The method includes receiving, at a CoGNAC agent, information comprising trace events and geo-location measurements of one or more user equipment (UEs). The information may be communicated by a node configured to wirelessly communicate with the one or more UEs. The method also includes retrieving, at a CoGNAC analyzer, a network configuration corresponding to the node and profile information corresponding to the one or more UEs. The method further includes determining, by the CoGNAC analyzer, utilizing the profile information corresponding to the one or more UEs, a CoGNAC value for each of the one or more UEs. The method also includes, based on the information and the CoGNAC value for each of the one or more UEs, forecasting, by the CoGNAC analyzer, a center of gravity for at least a portion of the node. The method further includes, based on the forecasted center of gravity, engaging, by the CoGNAC analyzer, operations support systems at a core network to provide instructions to the node to automatically make an angular adjustment for a lobe provided by at least the portion of the node.

In a third aspect of the present invention, a system for dynamically adjusting a center of gravity for network access and communication service (CoGNAC) is provided. The system comprises a CoGNAC agent that receives information comprising trace events and geo-location measurements of one or more user equipment (UEs), the information communicated by a node configured to wirelessly communicate with the one or more UEs. The system also comprises a CoGNAC analyzer that: forecasts a center of gravity for at least a portion of the node; and based on the forecasted center of gravity, engages operations support systems at a core network to provide instructions to the node to automatically make an angular adjustment for a lobe provided by at least the portion of the node.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 7:
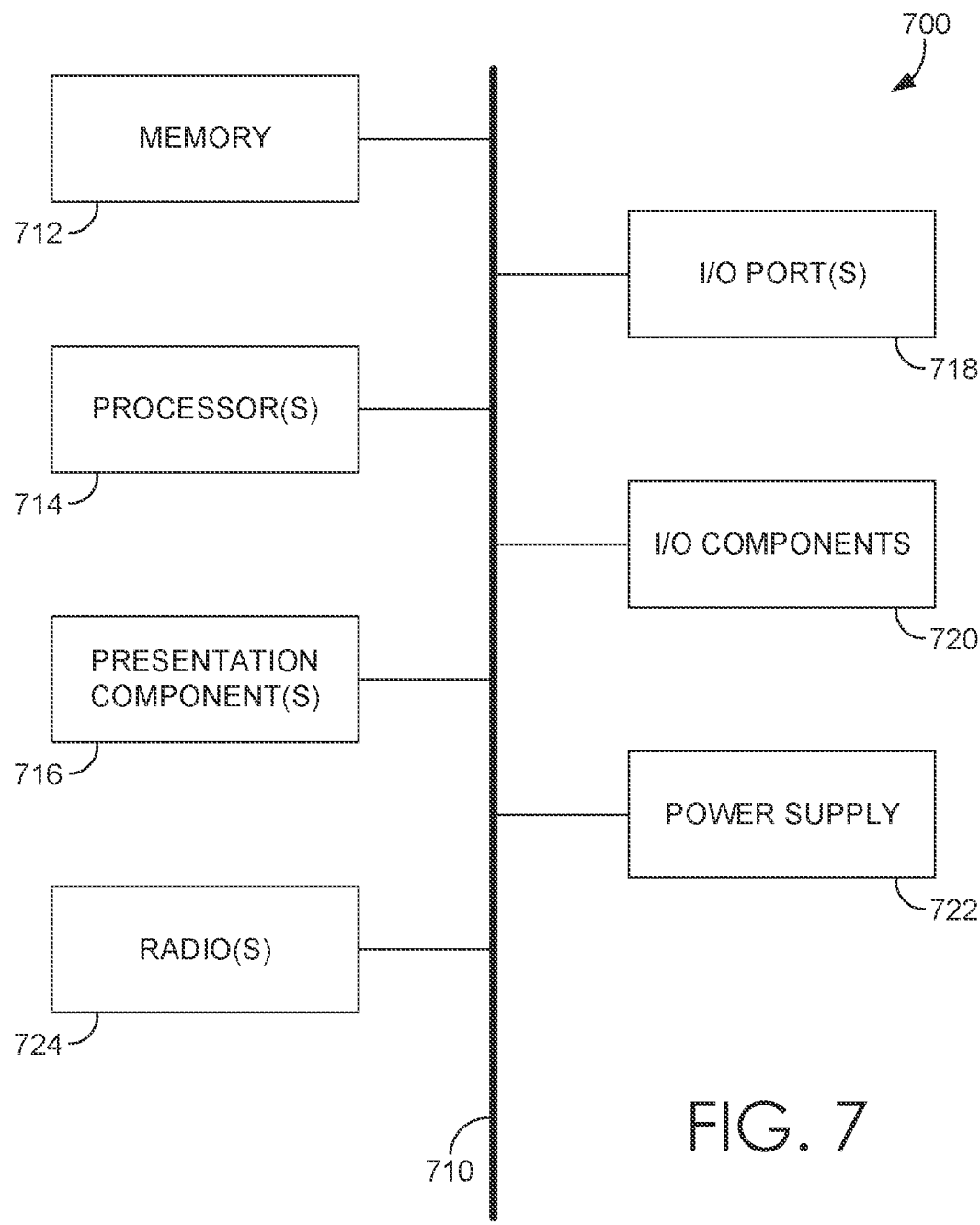
FIG. 7 depicts an exemplary computing device suitable for use in implementations of aspects herein.

A network cell may comprise a base station to facilitate wireless communication between a communications device within the network cell, such as communications device 700 described with respect to FIG. 7, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices.

For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 712 in FIG. 7 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include a center of gravity engine 108. The center of gravity engine 108 may be configured to, among other things, dynamically determine a center of gravity for at least a portion of a node, in accordance with the present disclosure. Additionally or alternatively, the center of gravity engine 108 may engage operations support systems at a core network to provide instructions to the node to automatically make angular or power adjustments for a lobe provided by at least the portion of the node.

In this way, center of gravity engine 108 allows for the dynamic definition of a CoGNAC value for each UE as well as dynamically identify the center of gravity for a group of served UEs within any coverage area. This enables all or part of the radiation elements of the node to be pointed in the direction of the center of gravity allowing most UEs to average their distance to the center line of the propagation lobe maximizes the overall network service experience. In practical terms, the CoGNAC engine keeps track of the current location and forecasted trajectory of all served UEs as well as their CoGNAC value to allow for the generation of a CoGNAC center of gravity angle to configure some or all the radiation elements within a particular serving area, cell, or antenna. Though center of gravity engine 108 is illustrated as a component of base station 104 in FIG. 1, it may be a standalone device (e.g., a server having one or more processors), a component of the UE 102, a service provided via the network 122, may be remotely located, or any combination thereof.

Figure 2:
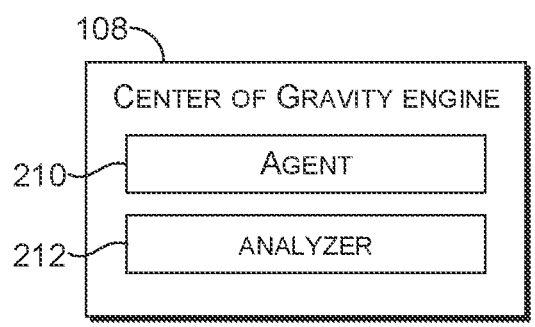
FIG. 2 depicts a diagram of a center of gravity engine, in accordance with aspects herein.

Referring now to FIG. 2, the center of gravity engine 108 may include, among other things, agent 210 and analyzer 212. The center of gravity engine 108 may receive, among other things, data from user devices, such as UE 102, within a network cell associated with a particular base station. Additionally or alternatively, the center of gravity engine 108 may receive, among other things, data from a node, such as base station 104, or from elements of the core network.

Agent 210 generally collects information corresponding to the UEs to pass along to analyzer 212. For example, agent 210 receives information comprising trace events and geo-location measurements of one or more UEs. The information may be communicated by a node configured to wirelessly communicate with the one or more UEs. In some aspects, agent 210 is an element of the node. In other aspects, agent 210 is an element of the core network. In yet other aspects, agent 210 is an element of the UE.

Analyzer 212 generally determines a center of gravity and engages the core network to provide instructions to the node. Initially, analyzer 212 retrieves a network configuration corresponding to the node and profile information corresponding to the one or more UEs. Utilizing the profile information corresponding to the one or more UEs, analyzer 212 determines a CoGNAC value for each of the one or more UEs. Based on the information and the CoGNAC value for each of the one or more UEs, analyzer 212 forecasts a center of gravity for at least a portion of the node. Based on the forecasted center of gravity, analyzer 212 engages operations support systems at a core network to provide instructions to the node to automatically make an angular adjustment for a lobe provided by at least the portion of the node.

Figure 3:
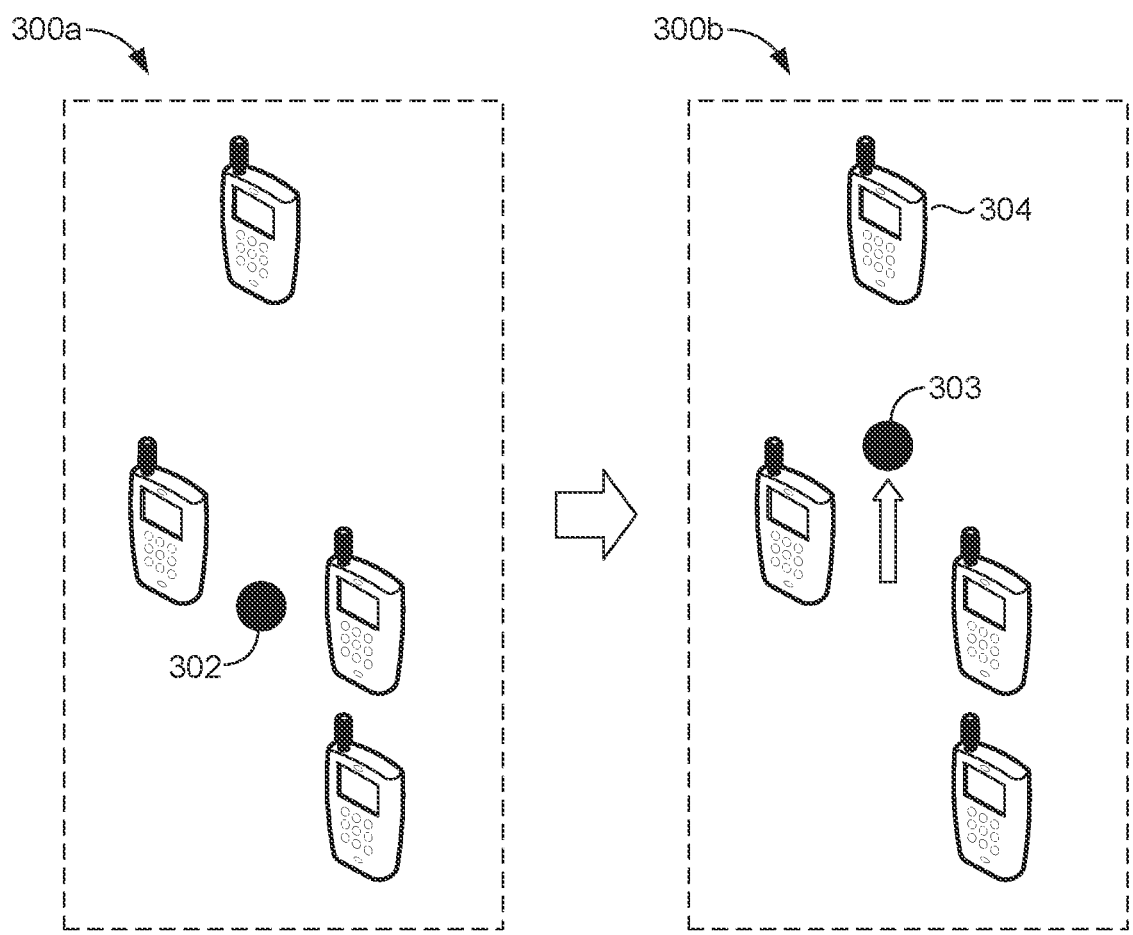
FIG. 3 depict an exemplary diagram illustrating a center of gravity for a UE population where all UEs are assigned an equal value and a center of gravity for a UE population where one UE is assigned a greater value than other UEs, in accordance with aspects herein.

In FIG. 3, an exemplary diagram 300 illustrates centers of gravity for two UE populations. Referring initially to UE population 300a, all UEs are assigned an equal CoGNAC value. In other words, no UE in UE population 300a has a business or technical value that distinguishes it from the other UEs. Accordingly, the center of gravity 302 is located where the signal provided to the UE population 300a is optimized for all UEs.

In contrast, referring to UE population 300b, all UEs are assigned an equal CoGNAC value except for UE 304, which is determined to have a greater CoGNAC value. As described herein, the greater CoGNAC value could be for various reasons. For example, UE 304 might be associated with a high value customer or an emergency vehicle. Or UE 304 might be an older model than the other UEs and require a better signal to have similar performance as the other UEs would have with a lesser signal. Or the other UEs might be newer models than UE 304 and require a lesser signal to have similar performance as UE 304 would have with a greater signal. Accordingly, the center of gravity 303 is located where the signal provided to the UE population 300b is optimized with consideration of the greater CoGNAC value corresponding to UE 304.

Figure 4:
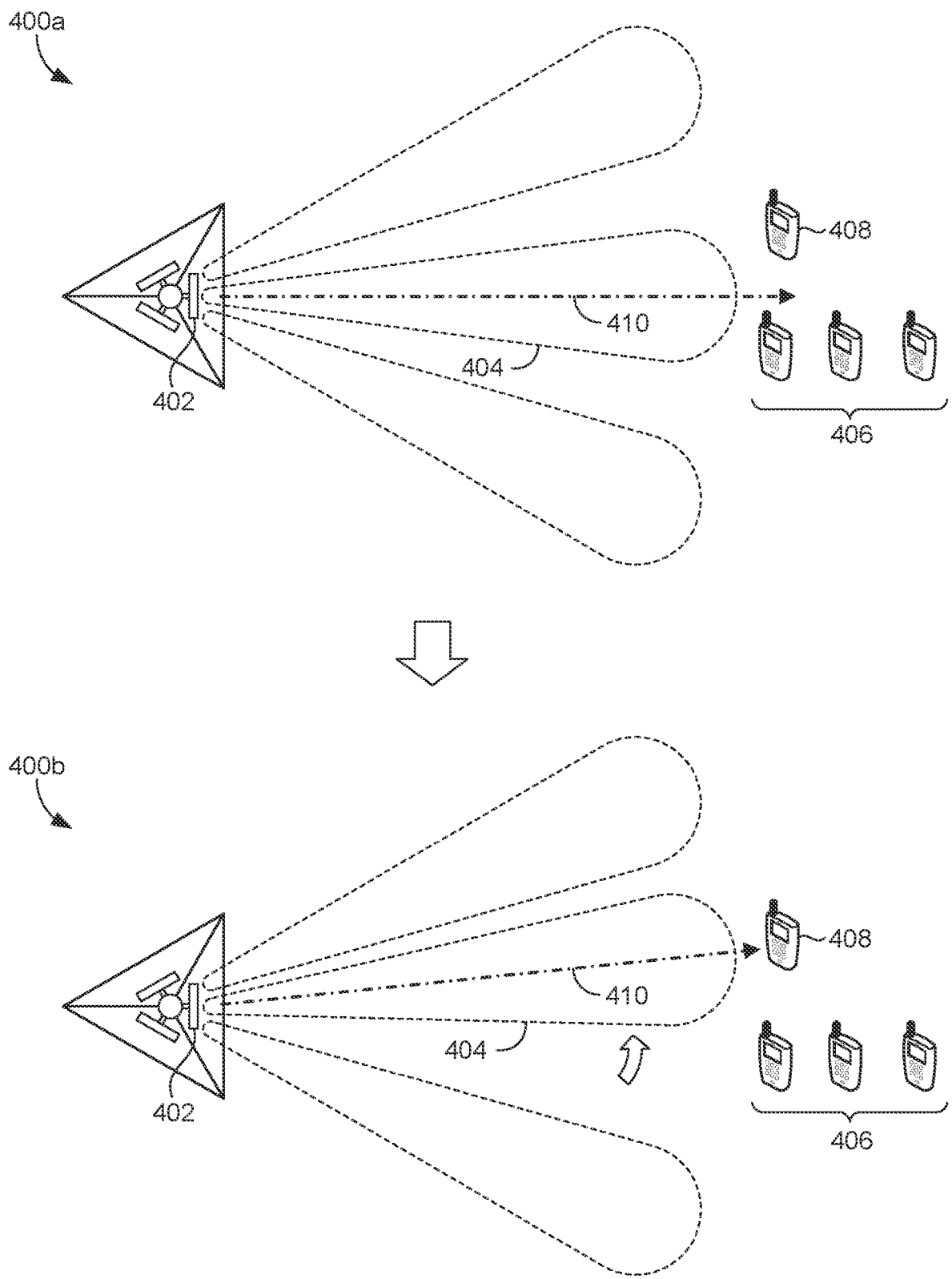
FIG. 4 depicts an exemplary diagram illustrating center lines of propagation lobes based on the current UE population, in accordance with aspects herein.

FIG. 4 depicts an exemplary diagram illustrating center lines of propagation lobes based on the current UE population, in accordance with aspects of the present invention. Referring initially to UE population 400a, the center line 410 of propagation lobe 404 provided by node 402 is in its initial, baseline state. As UEs 406 and UE 408 enter the coverage area, the center of gravity is dynamically determined.

For example, UE 408 may be determined to have a greater CoGNAC value than UEs 406. Again, UE 408 might be associated with a high value customer or an emergency vehicle. Or UE 408 might be an older model than the other UEs and require a better signal to have similar performance as the other UEs would have with a lesser signal. Or UEs 406 might be newer models than UE 408 and require a lesser signal to have similar performance as UE 408 would have with a greater signal. Accordingly, the node 402 is provided instructions to make an angular or power adjustment for a lobe provided by at least a portion of the node 402. In this example, the node 402 is provided instructions to shift the center of gravity 410 of lobe 404 causing it to point more directly to UE 408.

Figure 5:
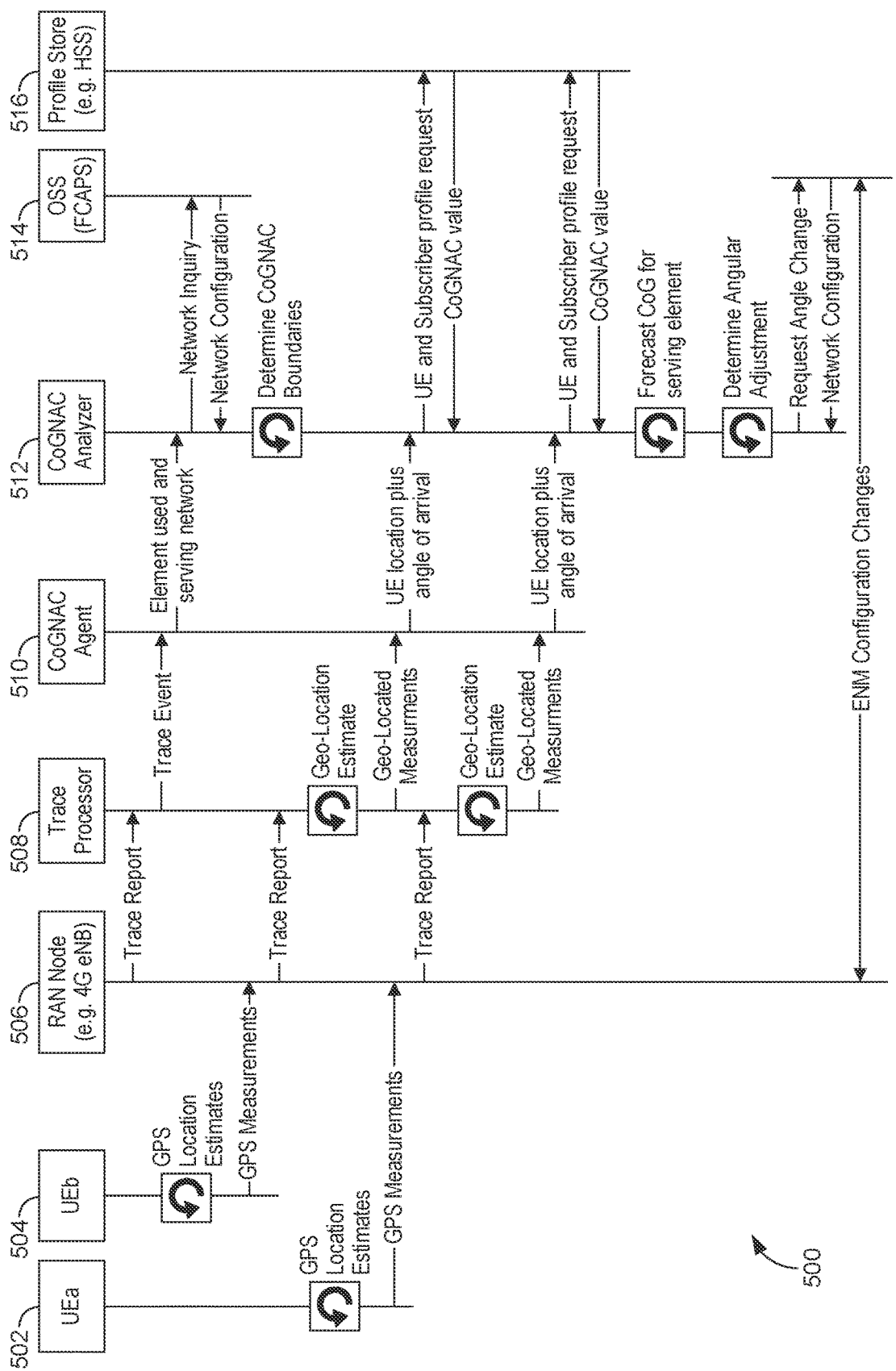
FIG. 5 depicts an exemplary communication flow, in accordance with aspects herein.

FIG. 5 depicts an exemplary communication flow 500, in accordance with aspects of the present invention. Initially, UEa 502 and UEb 504 determine GPS location estimates. UEa 502 and UEb 504 communicate GPS measurements to node 506. This information is relayed by the node 506 to trace processor 508 as part of the trace reports. A CoGNAC agent 510 is integrated into the existing trace processor sub-system to receive all events that allow it to harvest relevant CoGNAC details. For example, CoGNAC agent 510 collects information such as UEs current/forecasted location/trajectory, angle of arrival of RF signals, and serving elements and networks.

CoGNAC agent 510 conveys the collected information to a centralized CoGNAC analyzer 512 that is responsible for gathering UE and subscriber profile information from profile store 516 and configuration of radiating elements (i.e., network configuration, capabilities) and any constraints (e.g., CogNAC boundaries, geography, schedule, availability, planned outages) from operations support systems 514 to use when determining the center of gravity of the relevant served UE population. CoGNAC analyzer 512 dynamically assesses whether the current radiating parameters (e.g., tilt, azimuth, power, etc.) are optimized for the real-time center of gravity. With this information, CoGNAC analyzer 512 is able to calculate a CoGNAC value for each UE, understand the current radiation load and optimal center line, as well as the best horizontal and vertical area of coverage (beam width) for each of the antenna elements. Moreover, CoGNAC analyzer 512 leverages machine learning to learn how changes affect performance. If the CoGNAC analyzer 512 determines an angular adjustment is needed, the CoGNAC analyzer 512 requests the operations support systems 514 provide instructions to the node to make the change.

Figure 6:
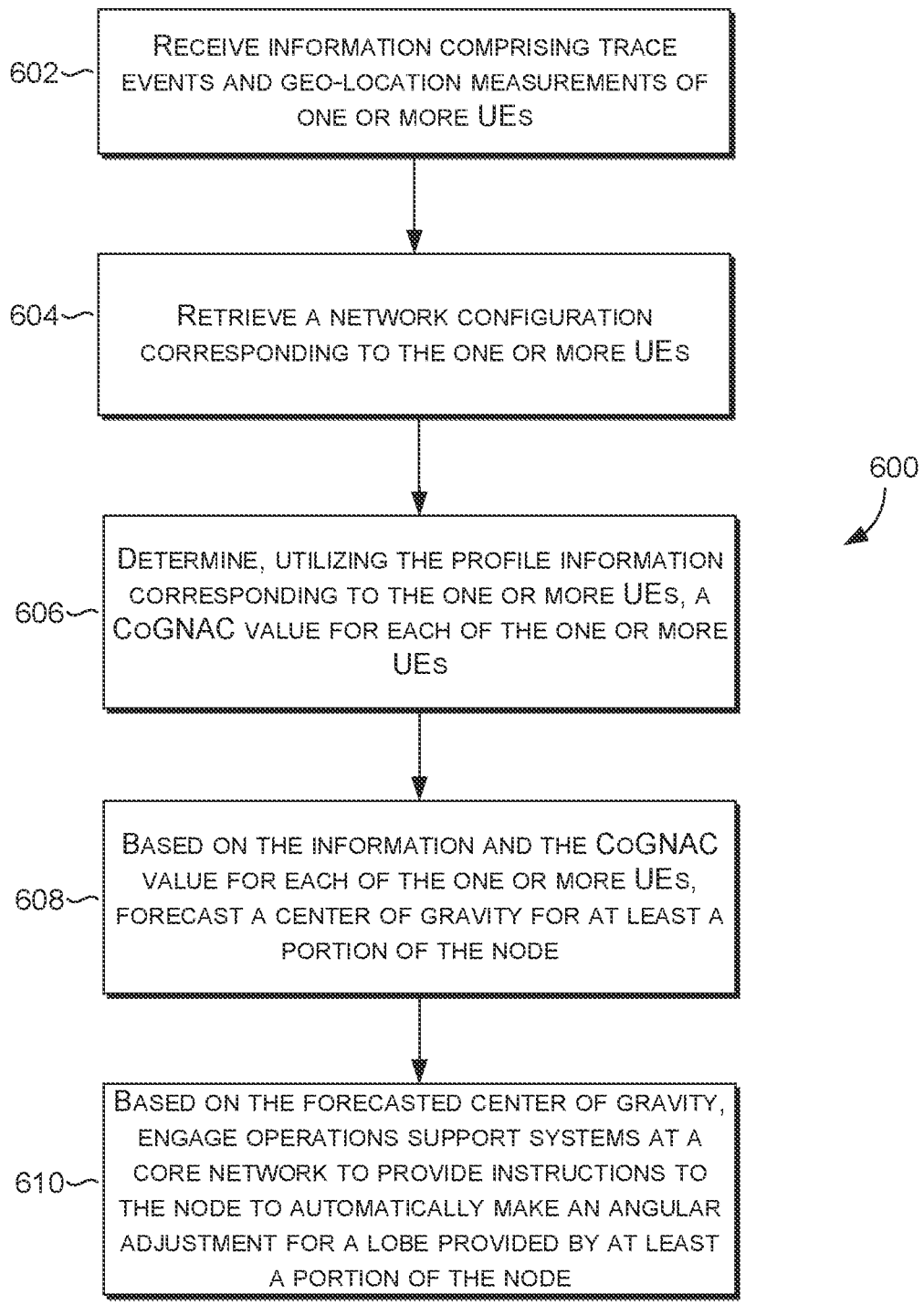
FIG. 6 depicts an exemplary method, in accordance with aspects herein.

Turning now to FIG. 6, flow diagram 600 comprises an exemplary method for dynamically adjusting a center of gravity for network access and communication service. Initially at block 602, information comprising trace events and geo-location measurements of one or more UEs is received. The information may be communicated by a node configured to wirelessly communicate with the one or more UEs. In some aspects, the trace events comprise one or more of: current location, forecasted location, trajectory, angle or arrival of radio frequency (RF) signals, serving elements and networks.

At block 604, a network configuration corresponding to the node and profile information corresponding to the one or more UEs is retrieved. A CoGNAC value for each of the one or more UEs is determined, at block 606, utilizing the profile information corresponding to the one or more UEs. Based on the information and the CoGNAC value for each of the one or more UEs, a center of gravity is forecast, at block 608, for at least a portion of the node.

At block 610, based on the forecasted center of gravity, operations support systems at a core network are engaged to provide instructions to the node to automatically make an angular adjustment for a lobe provided by at least the portion of the node. In some aspects, the angular adjustment corresponds to tilt or azimuth of the lobe provided by at least the portion of the node.

In some aspects, a geography of a coverage area for the lobe provided by at least the portion of the node is determined. Based on the geography and the forecasted center of gravity, the operations support systems at the core network may further be engaged to provide instructions to the node to automatically make a power adjustment for the lobe provided by at least the portion of the node.

Additionally or alternatively, upon determining the forecasted center of gravity is split in two directions, the operations support systems at the core network may be engaged to provide instructions to the node to automatically split the lobe provided by at least the portion of the node.

Upon determining the one or more UEs are no longer being provided service by at least the portion of the node, in some aspects, operations support systems at the core network are engaged to provide instructions to the node to automatically revert back to a baseline for the lobe provided by at least the portion of the node.

Referring now to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, power supply 714 and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component, such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 704 includes computer-storage media in the form of volatile and/or nonvolatile memory. Memory 704 may be removable, non-removable, or a combination thereof. Exemplary memory includes solid-state memory, hard drives, optical-disc drives, etc. Computing device 700 includes one or more processors 706 that read data from various entities, such as bus 702, memory 704, or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices, including I/O components 712, some of which may be built in computing device 700. Illustrative I/O components 712 include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for dynamically adjusting a center of gravity for network access and communication service (CoGNAC), the method comprising:
   receiving, at a CoGNAC agent, information comprising trace events and geo-location measurements of one or more user equipment (UEs), the information communicated by a node configured to wirelessly communicate with the one or more UEs;
   retrieving, at a CoGNAC analyzer, a network configuration corresponding to the node and profile information corresponding to the one or more UEs;
   determining, by the CoGNAC analyzer, utilizing the profile information corresponding to the one or more UEs, a CoGNAC value for each of the one or more UEs;
   based on the information and the CoGNAC value for each of the one or more UEs, forecasting, by the CoGNAC analyzer, a center of gravity for at least a portion of the node; and
   based on the forecasted center of gravity, engaging, by the CoGNAC analyzer, operations support systems at a core network to provide instructions to the node to automatically make an angular adjustment for a lobe provided by at least the portion of the node.

2. The media of claim 1, wherein the trace events comprise one or more of: current location, forecasted location, trajectory, angle or arrival of radio frequency (RF) signals, serving elements and networks.

3. The media of claim 1, wherein the angular adjustment corresponds to tilt or azimuth of the lobe provided by at least the portion of the node.

4. The media of claim 1, further comprising determining a geography of a coverage area for the lobe provided by at least the portion of the node.

5. The media of claim 4, further comprising, based on the geography and the forecasted center of gravity, engaging, by the CoGNAC analyzer, the operations support systems at the core network to provide instructions to the node to automatically make a power adjustment for the lobe provided by at least the portion of the node.

6. The media of claim 1, further comprising, upon determining the forecasted center of gravity is split in two directions, engaging, by the CoGNAC analyzer, the operations support systems at the core network to provide instructions to the node to automatically split the lobe provided by at least the portion of the node.

7. The media of claim 1, further comprising, upon determining the one or more UEs are no longer being provided service by at least the portion of the node, engaging, by the CoGNAC analyzer, operations support systems at the core network to provide instructions to the node to automatically revert back to a baseline for the lobe provided by at least the portion of the node.

8. A method for dynamically adjusting a center of gravity for network access and communication service (CoGNAC), the method comprising:
   receiving, at a CoGNAC agent, information comprising trace events and geo-location measurements of one or more user equipment (UEs), the information communicated by a node configured to wirelessly communicate with the one or more UEs;
   retrieving, at a CoGNAC analyzer, a network configuration corresponding to the node and profile information corresponding to the one or more UEs;
   determining, by the CoGNAC analyzer, utilizing the profile information corresponding to the one or more UEs, a CoGNAC value for each of the one or more UEs;
   based on the information and the CoGNAC value for each of the one or more UEs, forecasting, by the CoGNAC analyzer, a center of gravity for at least a portion of the node; and
   based on the forecasted center of gravity, engaging, by the CoGNAC analyzer, operations support systems at a core network to provide instructions to the node to automatically make an angular adjustment for a lobe provided by at least the portion of the node.

9. The method of claim 8, wherein the trace events comprise one or more of: current location, forecasted location, trajectory, angle or arrival of radio frequency (RF) signals, serving elements and networks.

10. The method of claim 8, wherein the angular adjustment corresponds to tilt or azimuth of the lobe provided by at least the portion of the node.

11. The method of claim 8, further comprising determining a geography of a coverage area for the lobe provided by at least the portion of the node.

12. The method of claim 11, further comprising, based on the geography and the forecasted center of gravity, engaging, by the CoGNAC analyzer, the operations support systems at the core network to provide instructions to the node to automatically make a power adjustment for the lobe provided by at least the portion of the node.

13. The method of claim 8, further comprising, upon determining the forecasted center of gravity is split in two directions, engaging, by the CoGNAC analyzer, the operations support systems at the core network to provide instructions to the node to automatically split the lobe provided by at least the portion of the node.

14. The method of claim 8, further comprising, upon determining the one or more UEs are no longer being provided service by at least the portion of the node, engaging, by the CoGNAC analyzer, operations support systems at the core network to provide instructions to the node to automatically revert back to a baseline for the lobe provided by at least the portion of the node.

15. A system for dynamically adjusting a center of gravity for network access and communication service (CoGNAC), the system comprising:
  a CoGNAC agent that receives information comprising trace events and geo-location measurements of one or more user equipment (UEs), the information communicated by a node configured to wirelessly communicate with the one or more UEs; and
  a CoGNAC analyzer that:
  forecasts a center of gravity for at least a portion of the node; and
  based on the forecasted center of gravity, engages operations support systems at a core network to provide instructions to the node to automatically make an angular adjustment for a lobe provided by at least the portion of the node.

16. The system of claim 15, wherein the CoGNAC analyzer further retrieves a network configuration corresponding to the node and profile information corresponding to the one or more UEs.

17. The system of claim 16, wherein the CoGNAC analyzer further determines, utilizing the profile information corresponding to the one or more UEs, a CoGNAC value for each of the one or more UEs.

18. The system of claim 17, wherein the forecasted center of gravity is based on the information and the CoGNAC value for each of the one or more UEs.

19. The system of claim 15, wherein the CoGNAC analyzer further determines a geography of a coverage area for the lobe provided by at least the portion of the node.

20. The system of claim 19, wherein the CoGNAC analyzer further, based on the geography and the forecasted center of gravity, engages the operations support systems at the core network to provide instructions to the node to automatically make a power adjustment for the lobe provided by at least the portion of the node.

* * * * *